United States Patent [19]

Hanning

[11] 4,102,973

[45] Jul. 25, 1978

[54] METHOD OF PRODUCING AN EXCITATION COIL FOR SHADED POLE ELECTRIC MOTORS

[75] Inventor: Robert Hanning, Campione d'Italia, Italy

[73] Assignee: Hanning Elektro-Werke, Fed. Rep. of Germany

[21] Appl. No.: 698,920

[22] Filed: Jun. 23, 1976

Related U.S. Application Data

[63] Continuation of Ser. No. 537,372, Oct. 30, 1974, abandoned.

[30] Foreign Application Priority Data

Jan. 4, 1974 [DE] Fed. Rep. of Germany ....... 2400379

[51] Int. Cl.² .............................................. B29F 1/10
[52] U.S. Cl. ..................................... 264/272; 264/278
[58] Field of Search .............................. 264/272, 278

[56] References Cited

U.S. PATENT DOCUMENTS

| | | | |
|---|---|---|---|
| 2,953,757 | 9/1960 | Yarrick et al. | 264/272 |
| 3,388,363 | 6/1968 | Novick | 264/272 |
| 3,395,209 | 7/1968 | Millard | 264/278 |
| 3,813,763 | 6/1974 | Church | 264/272 |
| 3,814,777 | 6/1974 | Schmidt | 264/278 |

FOREIGN PATENT DOCUMENTS

| | | | |
|---|---|---|---|
| 1,277,288 | 6/1972 | United Kingdom | 264/272 |
| 1,053,355 | 12/1966 | United Kingdom | 264/272 |
| 599,570 | 3/1948 | United Kingdom | 264/272 |

*Primary Examiner*—Donald J. Arnold
*Attorney, Agent, or Firm*—Stevens, Davis, Miller & Mosher

[57] ABSTRACT

A method of producing an excitation coil for a shaded pole electric motor comprises enclosing a coil winding element with reinforced thermoplastic synthetic material in an injection mold and supporting the coil winding element in the mold with retractable pins, the pins being retracted after partial setting of the thermoplastics synthetic material.

8 Claims, 3 Drawing Figures

METHOD OF PRODUCING AN EXCITATION COIL FOR SHADED POLE ELECTRIC MOTORS

BACKGROUND OF THE INVENTION

This is a continuation of application Ser. No. 537,372 filed Dec. 30, 1974, and now abandoned.

The invention relates to a method of producing excitation coils for shaded-pole electric motors, preferably for emptying pumps of household appliances, with an enclosing injection molding surrounding the coil winding on all sides and comprising thermoplastics synthetic material.

From German Petty Pat. No: 7 309 528 is known a coil in which coil windings produced without coil formers are held together by annular spring gripping elements, which simultaneously serve as spacers in the injection mold and are supposed to join together by their outer layer beginning to be dissolved in the injected substance. This desired connection, however, occurs only to a limited extent, and hair-line cracks at the flow seams are consequently not to be avoided. Therefore, there results indeed an insulating envelope which is adequately protective against contact which is very inadequate as regards its sealing effect against dampness.

Another known possibility of protecting exciter coils for emptying pumps of household appliances against dripping water and mechanical damage consists in providing them with protecting caps. This measure, too, is only imperfect and in addition implies considerable expenditure. Likewise, a casting of the coil in synthetic resin is not considered on account of costs which are too high, wherein the synthetic resin would, in addition, very soon become brittle due to the action of the dripping water.

SUMMARY OF THE INVENTION

It is an object of the invention to enable the provision of an excitation coil such as that of the type named above surrounded by plastics material, which coil resists all dampness influences occurring because of its completely homogenous envelope. Thus, short circuits, caused by dampness, in the coil winding and coil burning resulting therefrom should be avoided. Since, of course, a further cause of burning, which can never be completely excluded, are material faults in the winding wire which result in inter-turn and layer short circuits, the invention also has for an object to simultaneously make available a non-self-igniting excitation coil, in order, above all, to eliminate the hitherto existing danger of burning with regard to the use of the excitation coils in question for emptying pumps of household appliances.

According to the invention, there is provided a method of producing an excitation coil for shaded pole electric motors comprising supporting a coil winding element in an injection mold by means of a plurality of pins extending from walls of said injection mold to engage said coil winding element, injecting into said injection mold a thermoplastics synthetic material including a filler for increasing its strength and thermal conductivity, allowing said thermoplastics synthetic material to become partially set, retracting said pins into said walls of said injection mold so as to allow said partially set thermoplastics synthetic material to flow into spaces left by said retraction of said pins and allowing said thermoplastic synthetic material to set.

BRIEF DESCRIPTION OF THE DRAWINGS

The invention will now be described in greater detail, by way of example, with reference to the drawings, in which.

DESCRIPTION OF THE PREFERRED EMBODIMENT

Figure 1:
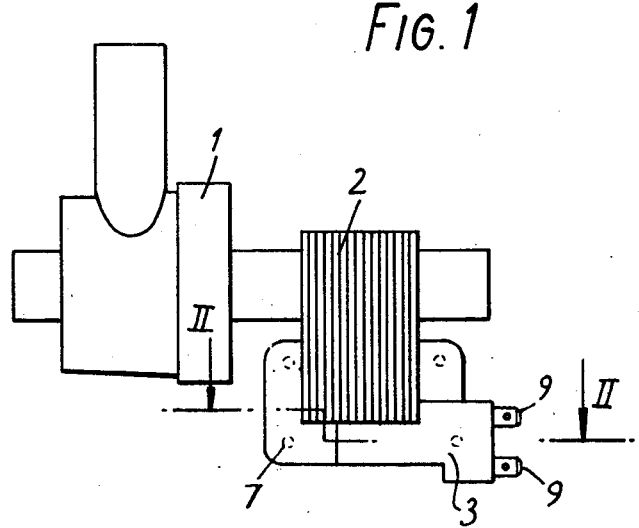
FIG. 1 shows a side view of an emptying pump for household appliances equipped with the excitation coil made in accordance with the invention.

Basically the invention proposes a method of producing an excitation coil with an enclosing injection molded material surrounding the coil winding on all sides and comprising thermoplastics synthetic material, in the case of which the thermoplastics synthetic material forming the enclosing injection molding contains a filler which increases both its mechanical strength and its thermal conductivity, such as glass fibre, and is molded to make a permanently homogeneous layer so that the coil winding or a thin-walled coil former carrying it if necessary, is held at the beginning of the injection operation with the help of movable spacing pins in the injection mold, which during the injection molding of the plastics which is still plastic at this point in time, are retracted and thus make possible its flowing-in in the region previously taken up by the spacing pins. Furthermore, the thin-walled coil formers may have, at the points of engagement of the movable spacing pins holding them in the injection mold, dimple-like projections, the height of which can be up to approximately 2/3 of the wall thickness of the enclosing injection molding. With this feature is ensured a more rapid closure of the gaps formed in the injection molding during the injection molding operation by the retraction of the movable spacers. The closing up is additionally assisted if the dimple-like projections of the coil former are formed conically.

The enclosing injection molding of the excitation coil should also enclose a pocket arranged in the coil former for the accommodation of a winding protection thermostat. Such a pocket facilitates the attachment of thermostats which otherwise would have to be bound onto the periphery on the coil winding. Moreover, the thermostat, in so doing always takes up the same position relative to the coil winding, from which more favorable prerequisites result for its dimensioning and function. Finally, it is also of advantage if the enclosing injection molding surrounds, in manner known per se, the winding-side ends of the connecting strips assigned to the coil winding.

For out of the ordinary uses, in which it is important to have an absolute hermetic seal, to achieve complete safety there exists the further possibility of providing the excitation coil with a lacquer or synthetic resin coating produced in an immersion process directly after producing the enclosing injection molding. In this way, any faulty places which might possibly occur in the plastics casing, even in spite of the most careful production, can be subsequently further eliminated and any penetration of liquid into the coil winding can be prevented with guarantee.

The newly developed excitation coil having a thoroughly homogeneous jacket of thermoplastics synthetic material, for shaded-pole electric motors, is characterized by a significant protection against dampness and contact. Likewise, there follows the effect sought by the invention and surprising to the person skilled in the art that the coil in accordance with the invention, on overload or short-circuiting of its winding, does not burn, although the thermoplastics synthetic material used for the enclosing injection molding is combustible in itself. This effect, achieved by overcoming a prejudice hitherto prevalent in general in the art is of extraordinary importance for the use of shaded-pole electric motors in household appliances on account of the considerable increase in operational safety connected therewith and represents an unprecedented advance in this area.

The cause of the fact that the coil proposed by the invention cannot surprisingly enough be self-igniting is to be seen in its completely homogeneous plastics envelope which is successful in spite of great difficulties. If a short circuit occurs in the interior of the coil, then a very strong heating occurs, which, however, does not lead to a fire, as the plastics with the solid filler on the one had dissipates well the resultant heat as well as on the other hand because of the filler protecting the content of the encasing, possessing a higher melting point than the plastics, does not burn and therefore no oxygen is able to penetrate into the coil winding. The plastics which becomes liquid in places as a result of the strong heating of the coil permits namely only the gases resulting in the coil interior to escape through the tight lattice of the filler without permitting any oxygen infeed. The final interruption of the circuit then occurs as a result of local melting of the coil winding or the response of a fuse connected in front of the coil, if very high current values occur.

The emptying pump 1 shown in FIG. 1 is equipped with a shaded-pole electric motor 2 driving it. The excitation coil 3 of this shaded-pole electric motor 2 is made up, in accordance with FIG. 2 of a thin-walled coil former 4 and a coil winding 5 applied thereupon. Both are surrounded by an enclosing injection molding 6 comprising thermoplastics synthetic material, such as a polyamide or a polyacetal.

The thermoplastics synthetic material forming the enclosing injection molding 6 contains a filler of glass fibre or the like which increases both its mechanical strength and its thermal conductivity. The enclosing injection molding 6 is molded in this way to form a permanently homogeneous layer such that the thin-walled coil former 4 carrying the coil winding 5 is held in the injection mold 10 (FIG. 3) at the beginning of the injection molding operation with the help of movable spacing pins 11, which are retracted by actuating means 12 during the injection molding of the plastics which is still plastic at this point in time and thus makes possible a flowing-in of the plastics material into the region taken up previously by the spacing pins 11. So that the hollow spaces resulting during the injection operation due to the spacing pins do not turn out to be too large, the coil former 4 has at the points of engagement, designated in FIG. 2 by means of the arrows A-D of the movable spacing pins holding it in the injection mold, dimple-like projections 7 which are conically shaped in cross-section and the height of which here corresponds to approximately half the wall thickness of the enclosing injection molding 6.

Figure 2:
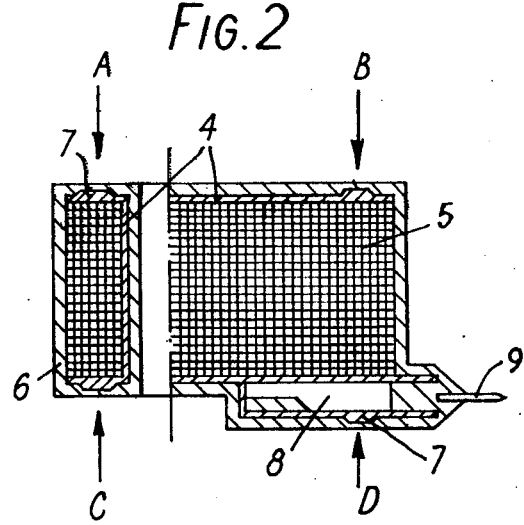
FIG. 2 is a section taken on the line II-II through the excitation coil of FIG. 1.
Figure 3:
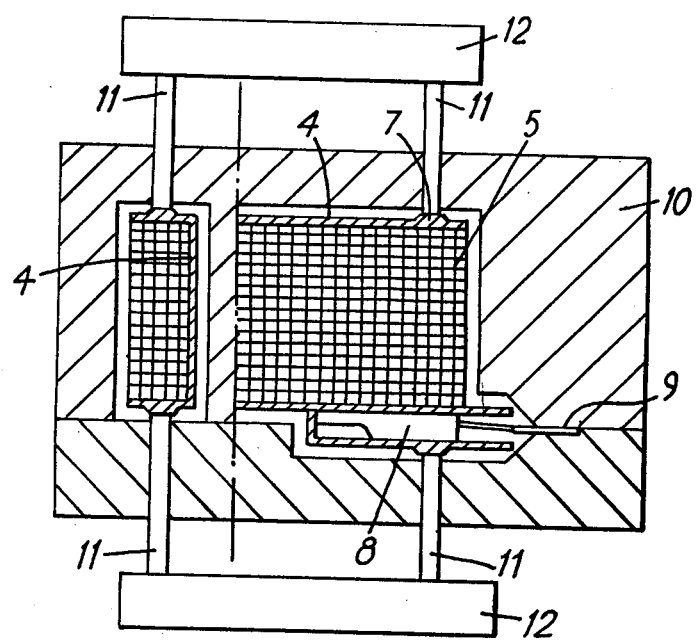
FIG. 3 is a section similar to that of FIG. 2 but showing the excitation coil in a mold for enclosing the coil in a thermoplastic synthetic material.

As FIG. 2 further shows, the enclosing injection molding 6 also encloses a pocket 8 arranged in the coil former 4 for the accommodation of a winding protecting thermostat. Likewise, the winding side ends of the connecting strips 9 assigned to the coil winding 5 are surrounded by the enclosing injection molding 6 comprising thermoplastics synthetic material.

In a development of the exemplary embodiment just explained, it would be conceivable to dispense with the coil former 4 which is located in the coil winding 5. In this case there should be used for the production of the coil winding 5 lacquered wire with a thermoplastics coating which confers a fixed form to the coil winding 5 on heating. The retractable spacing pins of the injection mold, acting at the points of attack A-D, would then engage directly on the coil winding 5.

It will be understood that the above description of the present invention is susceptible to various modification changes and adaptations.

What is claimed is:

1. A method of producing an excitation coil for a shaded pole electric motor comprising the steps of applying a coil winding to a thin walled coil former, said coil former having a plurality of projections thereon, placing said assembled coil winding and coil former in an injection mold having a plurality of pins extending from the walls thereof, said plurality of pins corresponding to the plurality of projections on said coil former, supporting said assembled coil winding and coil former within said injection mold by engaging said plurality of pins extending from the walls of the injection mold with the corresponding projections on said coil former, said pins providing the sole support for said assembled coil winding and coil former, injecting into said injection mold a thermoplastics synthetic material having a solid filler therein, said filler having a higher melting point than said thermoplastics material, allowing said thermoplastics synthetic material to become partially set but still flowable, retracting said pins into the walls of said injection mold thereby allowing said partially set thermoplastics synthetic material to flow into spaces left by the retraction of said pins, allowing said thermoplastics synthetic material to set completely, and removing the formed excitation coil from said injection mold, said coil having a dampness-resisting homogeneous envelope and being non-self-igniting, said thermoplastics synthetic material and solid filler dissipating heat from a short circuit occurring in the interior of the coil by allowing gases generated within said coil to escape through the filler lattice without permitting oxygen to enter the coil.

2. The method defined by claim 1, which includes the further step of immersing said formed excitation coil in a lacquer to provide additional protection against penetration of liquid into said coil.

3. The method defined by claim 1, which includes the further step of immersing said formed excitation coil in a synthetic resin to provide additional protection against penetration of liquid into said coil.

4. The method defined by claim 1, wherein the projections on said coil former have a conical cross-section.

5. The method defined by claim 1, wherein said thermoplastics synthetic material is selected from the group consisting of polyamide and polyacetol.

6. The method defined by claim 5, wherein said filler consists of glass fiber.

7. A method as defined in claim 1, wherein said thermoplastic synthetic material is arranged to enclose a pocket arranged in said coil former for the accommodation of a winding protection thermostat.

8. A method as defined in claim 1 wherein said thermoplastic synthetic material is arranged to enclose ends of connecting strips connected to said coil winding element.

* * * * *